United States Patent [19]

King et al.

[11] Patent Number: 4,468,163

[45] Date of Patent: Aug. 28, 1984

[54] TRAY LOADER METHOD AND APPARATUS FOR NUCLEAR FUEL PELLETS

[75] Inventors: Harold B. King, Wrightsville Beach, N.C.; Ching C. Lai, Livermore, Calif.; Edward S. Walker, Wilmington, N.C.

[73] Assignee: General Electric Company, San Jose, Calif.

[21] Appl. No.: 362,046

[22] Filed: Mar. 25, 1982

[51] Int. Cl.³ .............................................. G21C 19/18
[52] U.S. Cl. ...................................... 414/21; 414/58; 414/63; 414/110; 414/786
[58] Field of Search ................. 53/246, 250, 251, 496, 53/534, 543; 133/1 A, 5 A; 141/83, 275, 283; 177/145; 198/628; 221/297; 414/48, 103, 110, 21, 57, 63, 58, 786

[56] References Cited

U.S. PATENT DOCUMENTS

| | | | |
|---|---|---|---|
| 3,154,188 | 10/1964 | Cross | 53/496 X |
| 3,783,584 | 1/1974 | Rauser | 53/251 X |
| 3,897,673 | 8/1975 | Kee et al. | 53/496 |
| 4,049,068 | 9/1977 | Kavanagh et al. | 177/145 X |

*Primary Examiner*—Stephen Marcus
*Assistant Examiner*—Mark Thronson
*Attorney, Agent, or Firm*—Ivor J. James, Jr.; Samuel E. Turner; Raymond G. Simkins

[57] ABSTRACT

A method and apparatus for loading nuclear fuel pellets in levels onto a horizontally and vertically indexing tray string-by-string. The apparatus includes a belt feeder assembling each string at a location on pivotal blades over the tray. Arrival is optically noted and a pusher delivers the string to a drop site, completely loading the string onto the blades for delivery to the indexing tray.

11 Claims, 5 Drawing Figures

TRAY LOADER METHOD AND APPARATUS FOR NUCLEAR FUEL PELLETS

BACKGROUND

Fuel for nuclear reactors generally includes fuel rods, tubes, pins, elements or cladding substantially filled with fuel pellets of $UO_2$ or another fissile material preferably constituted in right cylindrical form. Nuclear reactors suitable for using such kinds of fuel are described for example in *Nuclear Power Engineering* by M. M. El-Wakil, published by McGraw Hill Book Company in 1962.

Fuel pellets may be loaded from a corrugated tray into rods or tubes as shown in U.S. Pat. No. 4,243,078, assigned to ASEA Aktiebolag.

It is accordingly an object of the instant invention to provide a process and apparatus for orderly loading such trays with fuel pellets.

It is another object of the instant invention to automate the loading of fuel pellet trays prior to filling the rods, tubes, or elements with pellets.

Another object is to load fuel pellets onto a tray in strings and in multiple levels, layers, or tiers.

SUMMARY

In fulfillment of the objects noted above, the tray loading apparatus and method described in a best mode herein has been invented. This apparatus mechanically loads strings of right cylindrical pellets on a receiving or indexing device including a tray which may be corrugated.

Arriving pellets are separated into groups and each group is, in sequence, assembled into a string of pellets and then pushed to a drop site on a pair of blades, which open or spread apart to drop or deposit each string or accumulation of pellets at a selected location of the tray or on previously deposited strings of pellets. The tray is horizontally and vertically positionable, so that opening the blades results in the correct placement of each string of pellets.

The pellets are individually fed onto the blades to form a string. Arrival is noted by one of a number of sensors able to activate a pusher for advancing the string to the drop site. The blades are then activated to deposit the string of pellets onto the tray below.

This tray is supported by a table having legs extending downward toward a weighing apparatus. When the tray is lowered sufficiently, the legs of the table engage with the weighing apparatus.

The table itself is supported by a horizontally movable platform, which in turn is supported by a vertically movable platform. Movement of each is motor driven, and the motors are electrically controlled, as for example by a microcomputer or processor or control means receiving input from the sensors noting formation of each string of pellets. After a string of pellets has been deposited, the tray is indexed or adjusted in position as will be described hereinafter.

BRIEF DESCRIPTION OF DRAWING

To better comprehend the invention and its preferred or best mode or embodiment as described below, a drawing is provided in several figures.

DESCRIPTION OF A PREFERRED EMBODIMENT OF THE INVENTION

Figure 1:
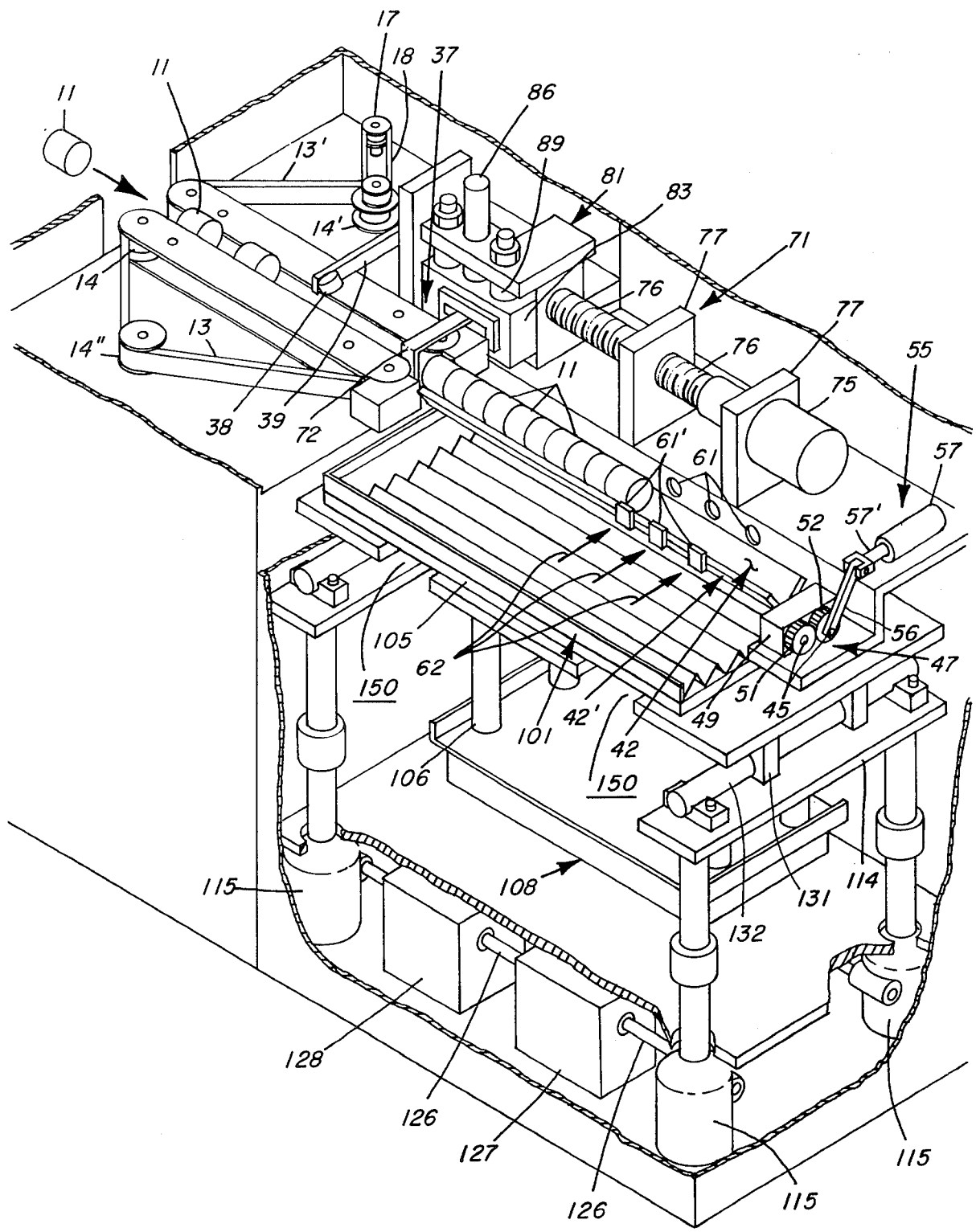
FIG. 1 shows an isometric view of certain features of the tray loader from one aspect (i.e., the tray side)

FIG. 1 shows the apparatus of the instant invention in a preferred mode. Nuclear fuel pellets 11, preferably in right cylindrical form arrive individually and travel between belts 13 and 13' driven by pulleys 14, 14', and 14".

The belts 13 and 13' act as part of a feeder means for advancing the pellets 11, and the pellets 11 generally travel between the belts 13 and 13" at irregular intervals between one another. The pellets 11 may be received by the belts 13 and 13' from a continuously moving belt means (not shown) which conveys pellets 11 from time to time. This belt means may for example be a conveyor for moving said pellets 11 and the movement may vary between continuous and sporadic motion.

In copending patent application Ser. No. 361,933, filed March 25, 1982, assigned to the same assignee as this invention and expressly incorporated herein by reference, there is described a source of such pellets.

In copending patent application Ser. No. 361,993, filed March 25, 1982, assigned to the same assignee as this invention and expressly incorporated herein by reference, there is disclosed another apparatus for forwarding pellets.

Figure 2:
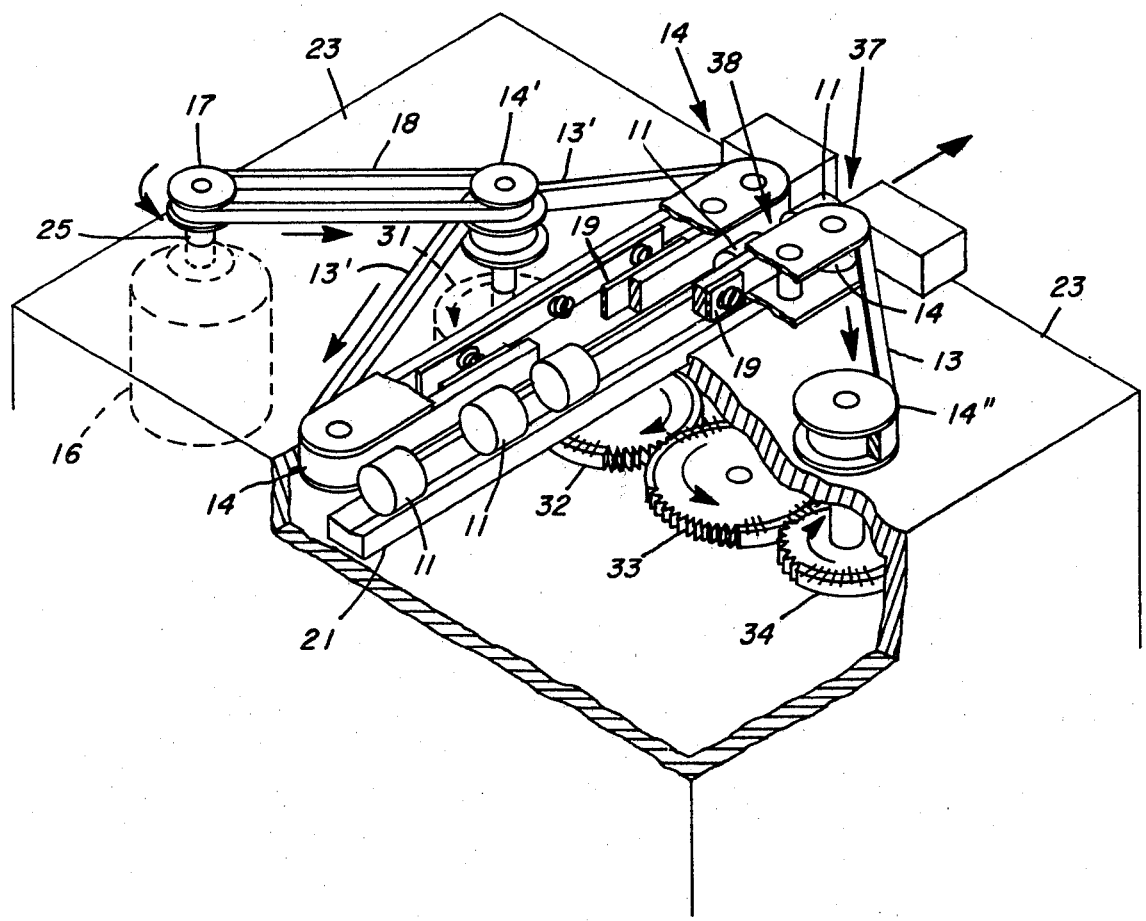
FIG. 2 shows a partial isometric view of features of the tray loader taken from the input side of the apparatus and having several portions of the loader broken away to more clearly show the drive mechanism for the apparatus.

A view of the arrival of pellets 11 and their progress between belts 13 and 13' is provided in FIG. 2. The Figure shows a motor 16 driving a pulley 17, which in turn drives a belt 18 and thus pulley 14' as well. The pellets 11 are supported between belts 13 and 13'. The belts 13 and 13' are supported between pulleys 14 by at least one inwardly biased plate 19 that eliminates curvature in the belts 13 and 13' between pulleys 14. More particularly, one of the plates 19 may be fixed and the other may be spring biased or loaded inwardly to insure that pellets 11 are supported between the belts 13 and 13'. The plates 19 insure that the pellets 11 are securely held between belts 13 and 13'. In the event that belts 13 and 13' fail sufficiently to support any of pellets 11, the pellets 11 are supported by a V-bar 21 mounted on a table surface 23. Accordingly the V-bar 21 is a guide for pellets 11 received between belts 13 and 13'. The motor 16 driving pulley 17 is mounted under this surface 23, but a shaft 25 extends through the surface 23 to effect driving the pulley 17.

In order to contribute to the forward movement or progress of the pellets 11, the belts 13 and 13' rotate in opposite directions: one of them travels in a clockwise direction and the other travels counterclockwise. Pulley 14' has two levels and transfers the rotary moment of belt 18 to drive belt 13' in its own counterclockwise direction. Toothed gears 31 through 34 cooperate to turn pulley 14" in a clockwise direction. This is accomplished by the shaft of pulley 14' extending below the table surface 23, where the gears 31 through 34 are mounted. In this embodiment, there are four gears. The first gear 31 is mounted on the shaft of pulley 14' and turns counterclockwise. The first gear 31 suitably meshes with the teeth of the second gear 32, causing the second gear 32 to rotate clockwise. By the same principle, the third gear 33 rotates clockwise. The shaft of the fourth gear 34 transfers this clockwise movement to pulley 14' causing the belt 13 to turn clockwise.

As the pellets 11 leave the belts 13 and 13', they arrive at a staging or assembly zone, site, or area 37 shown in FIG. 1. An optical detector 38 examines the region between the belts 13 and 13' for a reason to be shown hereinafter. As the pellets 11 accumulate, they fill the staging area 37, and pass onto blades 42 and 42'.

Figure 5:
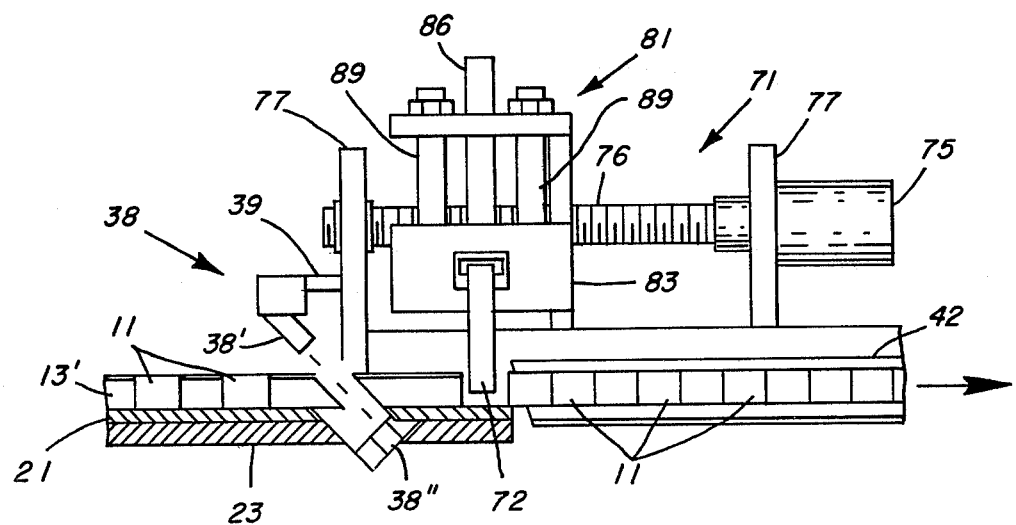
FIG. 5 is a partial cross-sectional view of a portion of the tray loader shown in FIG. 1 taken along a plane vertically bisecting the tray loader between belts 13 and 13'.

As shown in FIG. 5, the photoelectric detector 38, for example including a suitable light source 38' cooperating with a sensor 38", and mounted respectively on a bracket 39, is effective for noting the absence or presence of a pellet 11 at the end of the belts 13 and 13'. The detector 38 produces status indications reflecting the position of pellets 11 and includes means (not shown) to transmit these indications to a processor to be discussed below. The blades 42 and 42' (FIG. 1) are pivotable elongated members and turn about proximately spaced parallel axes of rotation. The minimum distance between the blades covers a distance less than a range of distances spanning the diameter of a representative one of the pellets 11. The blades 42 and 42' define a drop site for dropping the pellets 11 string by string onto a lower level after formation at the staging area or assembly area 37. Each string is assembled at or loaded onto the drop site prior to dropping onto and filling a predetermined number of tray locations and levels of the movable means to be discussed below.

The blades 42 and 42' act as a pair and open or spread to drop or deposit a string of pellets 11 by rotating about closely spaced horizontally parallel axes disposed in the direction of pellet flow. Stubs 45 at the ends of these blades 42 and 42' extend from the blades 42 and 42' along the axis of rotation of each blade and extend for support into receiving holes in support structures 47. One of the support structures 47 includes a portion 49 though which the stubs 45 extend into gears 51 and 52 which are mounted at the ends of these stubs 45 and on one side of blades 42, 42'. The blades 42 and 42' cooperate though the engagement of gears 51 and 52, insuring that the inclination of each of the blades 42 and 42' is similar although different in polarity from a central reference. Turning one of the gears turns the others as well, in an equal but opposite amount. A pusher 55 acting on a lever 56 determines the inclination of the blades 42, 42'. The pusher 55 may be hydraulically driven by an air cylinder 57. The pusher 55 acts as a deposit actuator for rotating one and consequently both gears 51, 52. The cylinder 57 includes a piston rod 57' for reciprocatingly extending and withdrawing from said cylinder, the end of said piston rod 57' pivotally attached to the end of said lever 56 located farthest from said one of said gears 51, 52.

As the accumulation of pellets at the staging area 37 overflows onto the blades 42 and 42', one of optical detectors 61 registers a first arriving pellet 11 at what will be referred to as one of respective general locations 62. The particular one of locations 62 selected indicates that the length of the string or row of pellets 11 has reached a predetermined desired length.

The detectors 61 of this embodiment are available from Skan-a-matic of Deerfield, Florida. The general locations 62 indicate where the pellets 11 arrive upon overflowing from the staging area 37. The detectors 61 incorporate light sources mounted on blade 42', and in each case the sources cooperate with respective sensors 61'.

The several general locations 62 define different lengths of strings of pellets between the several general locations and the staging area 37. The longest of these string lengths defines the length of pellet strings deposited directly into the tray to be described below. The next longest define pallet strings of one or more next tiers or levels of pellets on the tray. The shortest of the pellet strings is of course the top layer of pellets 11. To completely position each of the strings of pellets 11 on the blades 42 and 42' so that the front end of the string arrives at the drop zone, the processor 80 is suitably programmed to have the pusher 71 transfer the pellets 11 thereto. The detectors 61 suitably develop and transmit signals indicative of string formation prior to the string being pushed to the drop zone.

Figure 4:
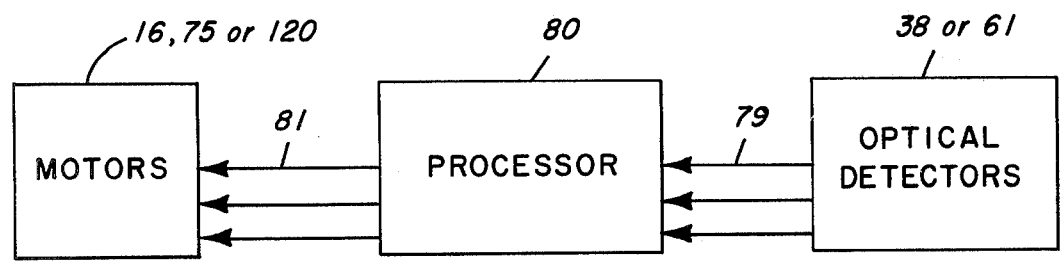
FIG. 4 is a block diagram illustrating the control function of the processor in this invention.

The pusher 71 removes the string from the staging area 37 by inserting a finger 72 behind the last of the pellets 11 constituting the particular string. The finger 72 is inserted behind the string and the pusher 71 pushes the string to a position determined by a controller, control means, or processor 80 (FIG. 4). The processor 80 determines the position on the basis of tray site and tier, as will be shown. The processor 80 indexes the tray vertically and horizontally and directs its operations and receives position indications regarding the pellets 11. When a complete string has been loaded at the staging area 37 as determined by detectors 61, and detector 38 sees a clear space between pellets 11 as shown in FIG. 5, the motor 16 and belts 13 and 13' stop or reverse. This insures that pusher 71 will not hit a pellet when finger 72 is inserted behind an accumulation of pellets 11.

The finger 72 (FIG. 1) is driven horizontally and in parallel with the axis of the pellet string by a motor 75 turning a screw drive or screw 76 supported by a structure 77 about its own axis. When the screw 76 turns, a carriage 81 holding the finger 72 translates or moves along the screw 76 in response to the rotation of the screw 76. The carriage 81 stays in alignment relative to structure 77 without turning about the axis of the screw 76, by bearing against a surface of one of structures 77.

The range of horizontal motion of carriage 81 on screw 76 is sufficient to extend behind a formed string of pellets 11 in the assembly area 37 and to move the string of pellets 11 to the drop zone on blades 42, 42'.

A block 83 holding finger 72 moves vertically on carriage 81 under the control of an air cylinder 86. Rods 89 keep block 83 in alignment. The finger 72 extends downward from block 83.

When a string of pellets 11 has been transferred to the drop zone by the pusher 71, the string is ready for loading onto a tray 101, which may have a plurality of corrugations, each capable of holding a string of pellets 11.

The tray 101 is located below the blades 42, 42' and it is supported by a table 105 having legs 106 extending toward a weighing machine 108. The tray 101 is part of a movable means including a vertically movable platform 114 supporting a horizontally movable platform 113.

The weighing machine 108 is supported in a fixed reference plane, and the tray 101 is vertically and horizontally positionable. In this embodiment, horizontal tray positioning is possible in a forward or reverse sense.

The table 105 can be lowered, enabling the legs 106 to extend below the horizontally and vertically movable platform 113, 114 and to engage the top of the weighing machine 108. This permits the weight of pellets 11 on tray 101 to be determined.

Figure 3:
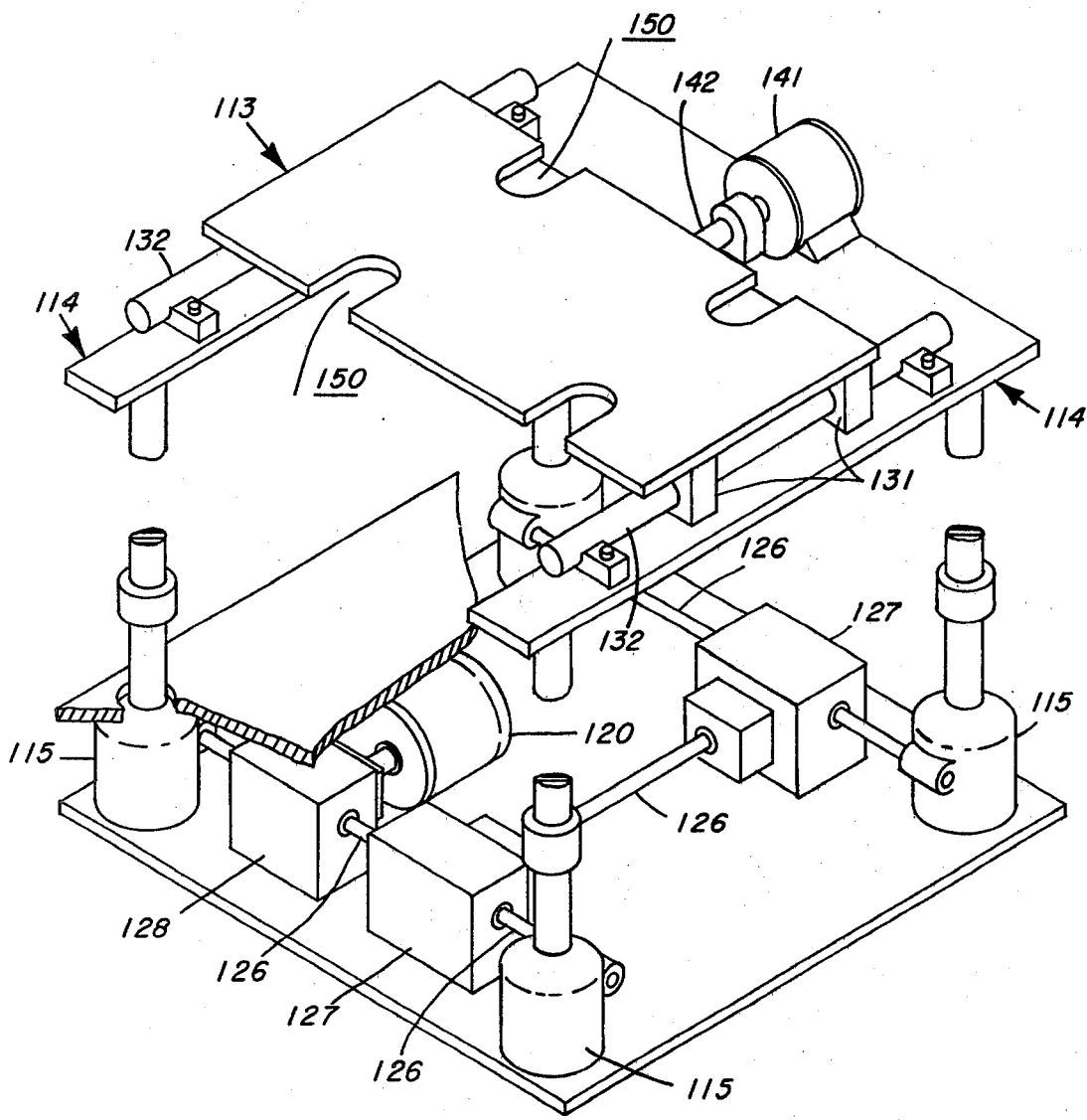
FIG. 3 shows several features of the tray loader unobstructed by certain other features of the loader already shown in FIG. 1 (for example, the vertical and horizontal drives for the tray loader are shown in FIG. 3 but not in FIG. 1)

The table 105 is supported by platforms 113 and 114 seen in FIG. 3. Raising and lowering platform 113 and 114 is accomplished by actuators 115, which are driven by a motor 120 coupled to the actuators 115 through a system of shafts 126 which may be in the form of an "H". The shafts 126 may lie in a horizontal plane and there is an actuator 115 at each of the four ends of the "H". The shafts 126 are coupled to one another through gears 127, which permits coordinated rotation of all shafts 126 in response to turning a single shaft 126.

The motor 120 itself engages one of these shafts 126 through another such gear 128. It follows that the motor 120 effectively turns all of the shafts in synchronism and causes the actuators 115 to lift or lower the platforms 113 and 114 without upsetting their generally level disposition. Platform 113 is capable of horizontal (i.e., forward and reverse) movement on the surface of platform 114.

The platform 113 is mounted on bushings 131 which slide on rails 132 mounted on platform 114. Forward and reverse movement is caused by a motor 141 turning a screw 142. The legs 106 of table 105 (in FIG. 1) extend through holes or recesses 150 (FIG. 3) in the platforms 113 and 114, enabling the platforms to support the table 105 during loading and to permit weighing of the tray 101 (and its load of pellets 11).

The ability of the tray 101 to adjust its position vertically and horizontally by the movement of platforms 113 and 114 permits the orderly loading of the tray 101 with strings of pellets 11 dropped or deposited from blades 42 and 42' onto selected positions of the tray 101.

It is considered desirable to load multiple levels, layers, or tiers of pellets 11 on the tray 101. In other words, it is deemed advantageous to load pellets 11 directly upon pellets 11, not just pellets 11 onto the tray 101.

At first, however, it is clear that a single layer of pellets 11 will be loaded directly onto the tray 101. To conveniently permit this and to prevent the horizontal movement of the pellets 11 on the tray 101, corrugations consisting of troughs and ridges in parallel are preferably formed in the surface of the tray 101. One corrugation may be used for each string deposited in a first layer on the tray 101.

Loading pellets 11 on the tray 101 is accomplished under control of the processor 80 (see FIG. 4) suitably programmed to index the horizontal position of the tray 101 after the deposit of each string of pellets 11. Pursuant to initial conditions set in softwear operating the processor 80, the tray 101 is set at a vertical position suitable for receipt of the first level of pellets 11. The tray 101 is also positioned horizontally to receive its first string of pellets 11. Horizontal indexing advances the tray 101 to a next horizontal receiving position preferably adjacent to the string of pellets 11 deposited just previously.

The number of strings of pellets 11 that can be deposited in a level on a particular tray 101 is a constant number dependent on the size of the tray 101 and this number is stored in the processor memory to set a limit to the number of horizontal string deposits conducted on the first level. When this limit is reached, the tray 101 is vertically indexed and horizontally repositioned to a starting position for the second level of pellets 11. Each string of pellets 11 in a level after the first is interstitially placed on the level immediately below it, and the number of strings deposited in a level is at least one less than the number in the level immediately below it. For example, the first string of the second level is preferably placed in a horizontal position between the first and second strings of the first level of pellets. In a preferred embodiment of the instant invention, three levels of pellets are deposited on the tray.

The following commercially available items are employed in the embodiment of the instant invention described herein:

A Bodine 527 Varispeed motor, which drives belts 13 and 13';

A MO62-FD06 slo-syn motor, which drives the screw of the pusher 71;

Actuators 115 sold by the Duff Morton Company;

Thompson ball bushings 131 carrying platform 113 on rails 132;

The processor 80, which is preferably an Intel 86/12-8 type microcomputer device, which receives information from detectors 38 and 61 and controls motors 16, 75, and 120; and The weighing machine 108, which is preferably a digital scale with a remote readout for display.

The foregoing description is susceptible of reasonable modifications that may occur to those skilled in the art. However, this invention is not meant to be limited to the embodiment just shown and described. The claims set forth the inventive concept and are intended to cover all modifications coming within the spirit and scope of the invention described herein.

What is claimed is:

1. An automatic apparatus for receiving pellets from a source, accumulating said pellets into groups and loading successive layers of said groups onto a tray; said apparatus comprising:

feeder means for receiving and transporting said pellets from said source;

a staging area for receiving said pellets from said feeder means;

rotatable blade means adapted to cooperate with said staging area for accumulating said groups of pellets and further adapted to deposit said groups onto said tray;

pusher means for advancing each of said groups fully onto said rotatable blade means preparatory to depositing each group onto said tray;

horizontal translation means for horizontally positioning said tray to receive successive groups of pellets;

vertical translation means for vertically positioning said tray to receive said successive layers of groups;

optical means disposed adjacent to said blade means for sensing the assembly of each group of pellets and for developing and transmitting signals which indicate the assembly of said groups; and control means for receiving said electrical signals, for actuating said pusher means on indication of assembly of a group, for actuating said rotatable blade means to deposit each group onto said tray, for actuating said horizontal translation means to reposition said tray horizontally with each deposit of a group on said tray and for actuating said vertical translation means to reposition said tray vertically with each completion of a layer of groups on said tray.

2. The apparatus of claim 1, wherein said apparatus further comprises weighing means for determining the weight of pellets on said tray and vertical support means, attached to the lower side of said tray, extending through said horizontal and vertical translation means for weighing engagement with said weighing means.

3. The apparatus of claim 2, wherein said control means is further adapted to position said tray and said vertical support means onto said weighing means whereby said pellets can be weighed.

4. A method of loading a tray with layers of groups of pellets, where said pellets arrive periodically from a source, said method comprising the steps of:
   (a) initially positioning said tray;
   (b) accumulating said periodically arriving pellets into a group of predetermined size;
   (c) advancing said group into the vicinity of said tray;
   (d) depositing said group into a predetermined location on said tray;
   (e) repositioning said tray horizontally after deposit of said group to receive deposit of another group;
   (f) repeating steps (b)–(e) until a predetermined number of locations constituting a layer are filled;
   (g) repositioning said tray vertically after said layer is filled; and
   (h) repeating steps (b)–(g) until a predetermined number of layers on said tray are filled.

5. A method of loading a tray with several layers of strings of right cylindrical pellets, each of said layers comprising several locations for said strings of pellets and where said pellets arrive periodically from a source, said method comprising the steps of:
   (a) initially positioning said tray so that a first location of a layer is accessible and initially selecting a first measure in length for said strings of pellets;
   (b) accumulating groups of said periodically arriving pellets, placing said pellets end to end and assembling therefrom a string of said selected length of said pellets;
   (c) positioning said string in the vicinity of said tray over said location;
   (d) holding in abeyance further periodically arriving pellets;
   (e) depositing said string into said location;
   (f) repositioning said tray horizontally to a next location to receive deposit of another string;
   (g) repeating steps (b)–(f) until a predetermined number of locations for said layer are filled with strings of pellets;
   (h) repositioning said tray vertically after said layer is filled;
   (i) reducing the quantity of said predetermined number of locations by at least one in number;
   (j) selecting a next, shorter measure in length for said strings of pellets; and
   (k) repeating steps (a)–(j) until a predetermined number of layers on said tray are filled.

6. The method of claim 5, said method comprising the further step of:
   (l) weighing said loaded tray whereby the weight of said pellets can be determined.

7. An apparatus for loading a tray with successive groups and successive layers of groups of right cylindrical pellets, said apparatus comprising:
   a pair of parallel, spaced, partially rotatable blades disposed over said tray, said blades, in a first position, being spaced apart a distance less than the diameter of any of said pellets and in a second position being spaced apart a distance greater than the diameter of any of said pellets;
   a source of said pellets;
   feeder means for receiving said pellets from said source,
   staging means for receiving said pellets from said feeder means, said staging means being adapted to permit said pellets to be urged onto said pair of blades, in said first position, from said staging means by other pellets being received by said staging means whereby successive groups of pellets can, in turn, be accumulated in said staging means and on said pair of blades;
   positioning means for advancing each said accumulated group of pellets from said staging means fully onto said blades;
   rotational means for moving said blades to said second position allowing each said accumulated group to be deposited into said tray;
   horizontal translation means for periodically moving said tray horizontally a distance sufficient to ensure an open location on said tray for receiving each succeeding group of pellets in a layer until said layer is completed;
   vertical translation means for periodically moving said tray vertically a distance sufficient to allow depositing groups of pellets in a layer atop a completed layer on said tray;
   first optical means for sensing a gap between said periodically arriving pellets sufficient to allow said positioning means to be actuated;
   second optical means disposed along said pair of blades for sensing the accumulation of pellets at said staging area and on said blades, for sensing the position of said accumulated group on said blades and for developing and transmitting signals which indicate the assembly and the position of each succeeding group; and
   control means for receiving and processing said signals, for actuating said pusher means on indication of accumulation of a group, for actuating said rotatable blade means to deposit each of said groups onto said tray, for actuating said horizontal translation means to reposition said tray with each deposit of a group and for actuating said vertical translation means to reposition said tray vertically with each completion of a layer of groups on said tray.

8. The apparatus of claim 7, said vertical translation means comprising, a vertically platform and actuator means for raising and lowering said vertically movable platform.

9. The apparatus of claim 8, wherein said apparatus further comprises:
   support means for supporting said tray; and
   said horizontal translation means comprising a horizontally movable platform for carrying said support means and rail means mounted on said vertically movable platform for guiding the horizontal movement of said horizontal platform.

10. The apparatus of claim 9, said apparatus further comprising:

weighing means for weighing the pellets on said tray,
vertical support means attached to the lower side of said support means and extending toward said weighing means; and
said vertical translation means being adapted for lowering said horizontal translation means and thereby bringing said vertical support means into weighing engagement with said weighing means.

11. The apparatus of claim 8, said second optical means further comprising a plurality of optical sensors, said sensors being disposed at intervals adjacent to said partially rotatable blade means and each of said sensors being adapted to detect the presence of a pellet adjacent to said sensor whereby the quantity of pellets in a group accumulated on said blades is indicated by the number of sensors detecting the presence of a pellet.

* * * * *